June 12, 1951 E. E. MAPES ET AL Re. 23,377

HYDRAULIC BRAKE SAFETY DEVICE

Original Filed July 27, 1948 3 Sheets-Sheet 1

Elsworth E. Mapes
Russell E. Cox
INVENTORS

BY Thomas A. O'Brien and Harvey B. Jacobson Attorneys

HYDRAULIC BRAKE SAFETY DEVICE

Original Filed July 27, 1948 3 Sheets-Sheet 2

Elsworth E. Mapes
Russell E. Cox
INVENTORS

BY Clarence A. O'Brien and Harvey B. Jacobson
Attorneys

HYDRAULIC BRAKE SAFETY DEVICE

Original Filed July 27, 1948 3 Sheets-Sheet 3

Elsworth E. Mapes
Russell E. Cox
INVENTORS

BY Clarence A. O'Brien and Harvey B. Jacobson
Attorneys

Reissued June 12, 1951

Re. 23,377

UNITED STATES PATENT OFFICE 23,377

HYDRAULIC BRAKE SAFETY DEVICE

Elsworth E. Mapes and Russell E. Cox,
Mena, Ark.

Original No. 2,484,177, dated October 11, 1949, Serial No. 40,804, July 27, 1948. Application for reissue October 6, 1950, Serial No. 188,858

18 Claims. (Cl. 303—84)

Matter enclosed in heavy brackets [ ] appears in the original patent but forms no part of this reissue specification; matter printed in italics indicates the additions made by reissue.

This invention comprises novel and useful improvements in a hydraulic brake safety device and more specifically pertains to a safety device incorporated in a slave cylinder assembly interposed between the master cylinders and the wheel cylinders of a hydraulic brake system for vehicles and the like.

The principal object of this invention is to provide a safety device which may be applied between the pedal operated master cylinder and the individual wheel brake cylinders for improving the operation of the latter, for preventing a leak in a wheel cylinder or its operating brake line for rendering the entering hydraulic brake system inoperative, and for indicating the presence of abnormal travel of the slave cylinder pistons occasioned by a shortage of brake fluid in one of the brake cylinder operating lines or by the need for adjusting the brake shoes.

An important feature of the invention resides in the provision of a slave cylinder assembly which may be readily interposed between a master brake pedal operated cylinder and the individual wheel brake cylinders, whereby a leak in one of the wheel cylinders or its hydraulic brake line will not bleed the entire system of hydraulic fluid or render the same inoperative.

A further feature of the invention resides in the provision of a slave cylinder assembly as set forth in the preceding paragraph, wherein a plurality of slave cylinders are provided, each operatively connected by a single hydraulic line with the foot pedal operated master cylinder, each of the slave cylinders being operatively connected to one or more of the wheel cylinder hydraulic lines for actuation of the wheel cylinders in response to operation of the master cylinder.

Yet another important feature of the invention resides in the provision of a slave cylinder assembly as set forth in the foregoing features wherein a plurality of parallel cylinders are provided having slave pistons reciprocable therein, and wherein there are provided detachable head plates at opposite ends of the cylinder assembly for obtaining access to the actuating and actuated chambers of the slave pistons.

Yet another feature of the invention resides in the provision of a slave cylinder assembly as set forth in the foregoing features wherein the common head plate for the pressure or actuating chambers of the slave pistons is provided with a single closure plug for filling the same, which closure plug extends into a portion of each of the slave cylinders, and is provided with switch means for energizing a signaling circuit together with stop means for preventing damage of the switch means by undue travel of the slave pistons.

A still further important feature of the invention resides in the provision of a removable plug as set forth in the foregoing feature, wherein that portion of the plug extending into each of the slave cylinders carries a first switch means and a second switch means, together with a movable actuating member for successively energizing the two switch means, the actuating member being engageable by and operable by its slave piston when the latter has traveled a predetermined distance in the cylinder, for successively indicating a preliminary and a final warning or signal.

Yet another important feature of the invention resides in the provision of a removable plug as set forth in the foregoing feature, wherein that portion of the plug extending into each slave cylinder is provided with an inwardly extending stop, engageable with a surface upon the slave piston for limiting inward movement thereof and protecting the switch actuating member from damage thereby, and wherein the actuating member is carried by the stop.

A still further important feature of the invention resides in the provision of a fastening means for engaging and retaining the actuating member when the latter has been moved into position with the final warning signal switch.

A still further and additional feature of the invention resides in the provision of a removable closure plug as set forth in the foregoing features, wherein the entire safety switch and stop mechanism may be removed as a unit from each of the slave cylinders for inspection, servicing or repairs as desired, and wherein such movement is necessary in order to release the fastening means from holding the actuating member in its final warning locked position.

And a final important feature of the invention to be specifically enumerated herein resides in the provision of a slave cylinder assembly as set forth in the preceding features, which may be readily applied to existing hydraulic brake systems or may be conveniently incorporated in such systems during the manufacture of the same, and in which the principles of the invention are equally adaptable to installations wherein one or more wheel cylinders may be controlled by one of the slave cylinders.

These, together with various ancillary features and objects of the invention which will later become apparent as the following description proceeds, are attained by this device, preferred embodiment of which have been illustrated by way of example only in the accompanying drawings, wherein.

Figure 1:
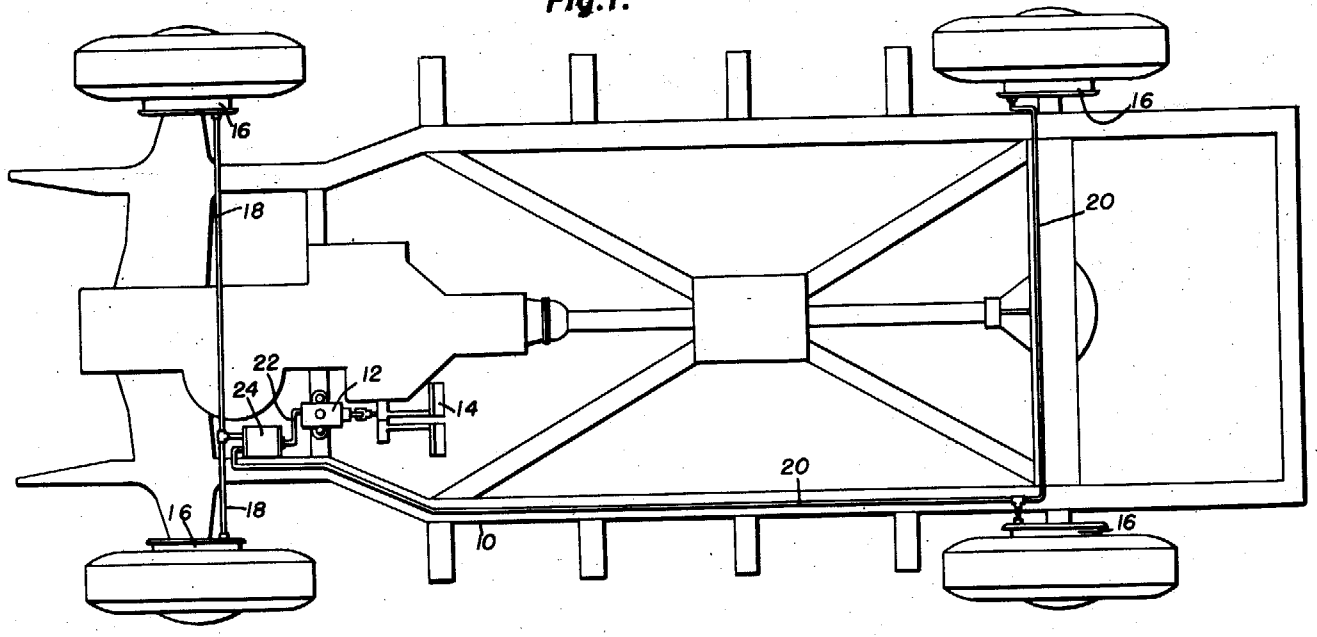
Figure 1 is a top plan view showing diagrammatically the manner in which the slave cylinder assembly may be applied and connected with a conventional form of hydraulic brake system and operatively connected to the pedal operated master cylinder and the individual wheel brake cylinders thereof.

Referring now more specifically to the accompanying drawings, wherein like numerals designate similar parts throughout the various views, attention is directed first to the embodiment set forth in Figures 1–6, wherein in Figure 1 there is disclosed the chassis or running gear framework of an automotive vehicle of any suitable type to which the principles of this invention may be applied, this framework being denoted by the numeral 10. Mounted upon the framework in any desired manner, is a master cylinder 12 connected with a foot pedal 14 for operation thereby, whereby the individual wheel or cylinder brakes controlling the brake mechanisms for each wheel, indicated generally by the numeral 16, may be operated. The wheel brake assemblies for the front wheels of the vehicle are provided with hydraulic brake operating lines 18, while the rear wheel brake assemblies are provided with similar brake operating lines 20, all in accordance with conventional design.

Heretofore, in the conventional hydraulic brake operating mechanism for a vehicle, the master cylinder 12 is directly connected with the lines 18 and 20, whereby all of the wheel cylinders are simultaneously energized by a single application from the master cylinder 12 as the foot brake 14 is operated. However, in accordance with the principles of this invention, the discharge line 22 connecting the master cylinder 12 with the individual wheel cylinder lines has interposed therein and connected thereto a slave cylinder assembly 24 to be hereinafter described, this cylinder separately controlling and energizing the hydraulic lines 18 of the front brakes and the hydraulic lines 20 of the rear brakes as set forth hereinafter.

Figure 2:
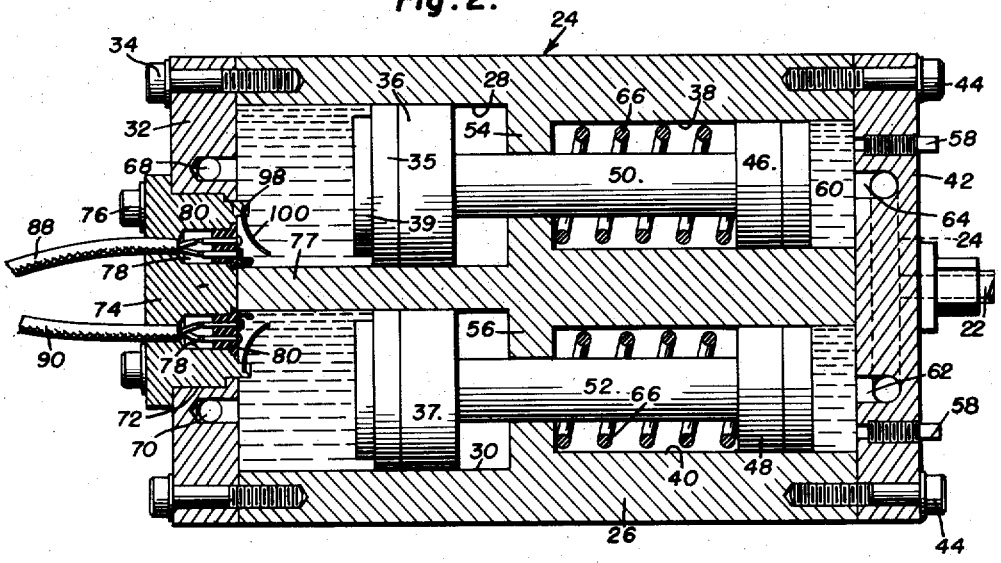
Figure 2 is a vertical longitudinal sectional view through one form of the slave cylinder assembly in accordance with this invention.

As will be best seen by reference to Figure 2, the slave assembly 24 preferably includes a casing 26 of any suitable material, this casing being provided with a pair of substantially parallel bores 28 and 30 at one end thereof, these bores extending through one end of the casing 26 and being closed by a removable end cover plate 32 retained as by fastening screws 34 or the like. Slidably received in the bores 28 and 30, are a pair of slave pistons 36 and 37 of similar construction, which in any suitable manner have a fluid-tight fit in the bores 28.

Thus, a packing means 35 of any known construction may be provided, and the outer ends of the pistons 36 and 37 are preferably provided with identical diametrically reduced axial extensions 39 which are of less diameter than the bores 28 and 30 to provide an annular space therearound, for a purpose to be later set forth.

Aligned with the bores 28 and 30 are respective bores 38 and 40 which as shown may be of a reduced diameter, although if desired these bores may be of greater diameter than the bores 28 and 30. The bores 38 and 40 extend through the other end of the casing 26, and are closed by a removable cover plate 42 detachably mounted thereon as by fastening screws 44 or the like. A pair of pistons 46 and 48 of identical construction are slidably received in the bores 38 and 40, these pistons being provided with suitable packing means of any known type, and being rigidly connected to the pistons 36 and 37 as by rigid connecting rods 50 and 52. As shown in Figure 2, partitions 54 and 56 divide the bores 28 and 38 and 30 and 40, respectively, and the piston rods 50 and 52 are slidable through suitable apertures in these partitions.

The cover plate 42 is provided with suitable removable plugs 58 by means of which fluid may be supplied to and air or fluid bled from the chambers *60* between the pistons 46 and 48 and the head plate 42, as desired or found to be expedient.

Passages [60 and 62] *62 and 64* formed in the head plate 42 freely communicate with the chambers in the cylinders 38 and 40 to the right of pistons 46 and 48, and these passages communicate with a common source of fluid pressure, namely, the previously mentioned conduit 22 constituting the discharge or delivery conduit from the master cylinder 12. It will thus be seen that upon actuation of the master cylinder by the pedal 14, fluid will be displaced equally to the two chambers between the pistons 46 and 48 and their head plate 42, to thereby equally apply [a force] *equal pressures* urging these pistons, and consequently the pistons 36 and 37, toward the left of Figure 2.

Suitable compression springs 66 are mounted in the bores 38 and 40 and are seated between the partitions 54 and 56 and the left ends of the pistons 46 and 48, to thereby yieldingly urge the piston assemblies towards the right or in their outward position in the slave cylinder casing.

Figure 3:
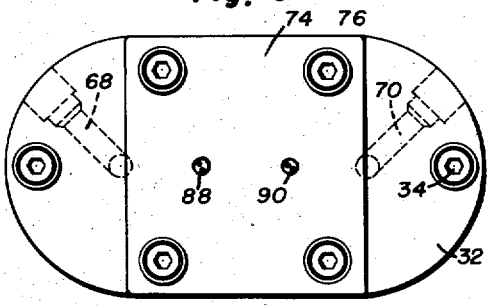
Figure 3 is an end elevational view of the cover plate for the compression or actuated chambers of the slave cylinder assembly.
Figure 4:
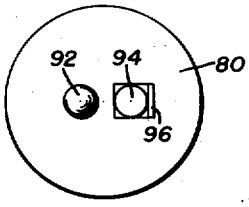
Figure 4 is an end elevational view of one of the switch elements.
Figure 5:
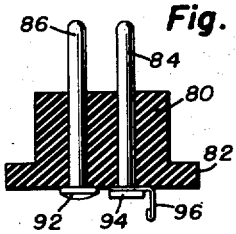
Figure 5 is a longitudinal sectional view through the insulating core and stationary terminals of one of the switch elements.

As will be more readily apparent from Figures 2 and 3, the head plate 32 is provided with discharge passages 68 and 70 which respectively communicate with the pressure chambers formed between the head plate 32 and the left ends of the pistons 36 and 37 in the cylinders 28 and 30, the passages 68 and 70 being respectively connected to the hydraulic brake lines 18 and 20, whereby the piston 36 will displace fluid and therefore operate the two front brake cylinder assemblies by means of the lines 18, while the piston 37 will displace fluid in and operate the rear brake cylinders through the lines 20.

This construction has the advantage that if a leak would occur in any of the four hydraulic lines, only one set of two individual wheel cylinders would be rendered inoperative or impaired in its actuation, while the other cylinder would still be maintained filled with fluid and continue in operation. Thus, the effectiveness of the brake system upon a vehicle is greatly enhanced, and the safety of operation of the vehicle is improved.

As will be readily understood, any suitable means not shown may be provided for venting the chambers in the bores 28, 30, 38 and 40 on the adjacent sides of the pistons 36 and 46 and 37 and 48.

It is, however, an essential and basic feature of this invention to provide an indicating means for giving warning when any of the brake lines develop a leak by lacking in fluid, or undue travel occurs in the movement of the slave piston assemblies. It is further desired that this signaling means shall include compactly arranged elements whereby the entire signaling assembly may be removed bodily from the slave cylinder assembly with a minimum of effort, for rapid replacement or servicing or repairs as desired.

Accordingly, in furtherance of this purpose, the closure plate 32 is provided with a substantially axial opening 72, within which is detachably secured a closure plug 74 as by means of fastening screw 76, the inner end of this plug having a shoulder portion seated upon a flange in the aperture 72 as shown. The inner surface of this plug is thus fully exposed to both of the pressure chambers of the cylinders 28 and 30 as will be apparent. It is preferably desired that the end of the closure plug 74 shall be seated against the end of the partition 77 which is an integral part of the slave cylinder assembly casing 26, and is interposed between the two bores 28 and 30. If desired, suitable sealing means, not shown, may be interposed to establish a leak-proof joint at this point between the two cylinder pressure chambers.

The inner surfaces of plug 74 are provided with a pair of axially extending bores or recesses 78, in which are removably seated insulating plugs 80 of any suitable dielectric material, these plugs having annular flanges 82 engaging cooperating counterbores at the open extremities of the bores 78, whereby the dielectric plugs may be securely seated in a substantially liquid-tight manner. It is contemplated that the bores 78 shall be so arranged upon the plug 74 as to enable the dielectric plugs to be positioned closely adjacent the partition member 77 between the two pressure chambers of the cylinder bores 28 and 30, for a purpose which will be later apparent.

Extending through each of the insulated plugs 80 is a pair of electrical conductors 84 and 86 to which are attached cables enclosed in housings 88 and 90, one such conduit or housing being provided for each of the cylinders 28 and 30. The ends of the conductors 84 and 86 are headed as at 94 and 92, respectively, to provide electrical contacts on the surface of the plugs 80 which are exposed to the interior of the pressure chambers of the cylinders 28 and 30. Carried by one of the conductors as 84, is a metallic electrically conductive hook fastener 96 for a purpose to be presently set forth.

The plug 74 is provided adjacent each of the insulated plugs 80, with an integral lug or boss 98 which extends inwardly of the cylinder bores 28 and 30, and a flexible metallic movable switch contact 100 of the leaf spring type, is carried by each of the lugs 98 in position for selective and sequential engagement with the headed contacts 92 and 94. The arrangement is such that [after] *during* [a predetermined amount of travel of the pistons 36 and 37, the annularly reduced portions 39 of the pistons will engage the flexible contact 100, and gradually move the same towards the fixed contacts 92 and 94, until eventually the end of the movable contact 100 engages the hook fastener 96 carried by the contacting terminal 94, to thereby establish a ground for the electrical conductor in the housings 88 or 90, to which the terminal 84 is connected, thereby energizing a warning signal as set forth hereinafter.] *progressive travel of either of the pistons 36 and 37 through predetermined positions towards the head 32 will cause the reduced portion 39 to first engage and flex the spring contact 100 associated therewith into contact with the fixed contact 92 to ground the conductor 86. Further travel of the piston moves the contact to engage the outer extremity of the electrically conductive hook 96 and the fixed contact 94 to ground the conductor 84, the contacts 100 and 92 remaining in continuous engagement. It will be seen that if the piston retreats at this time the contact 100 will sequentially disengage the contact 94 and the contact 92; however, further movement of the piston towards the head 32 will force the spring contact beneath the hook fastener 96, the latter being received in the annular space surrounding the reduced portion 39, whereby the contact 100 will thereafter be held in a position grounding the conductors 86 and 84 irrespective of subsequent positions of the piston. It will be appreciated that the spring contact may be conveniently reset by hand upon removal of the plug 74.*

[Upon further inward movement of the member 39, which inward movement results in the hooked fastener 96 being positioned in the annular space between the reduced portion 39 and the walls of the cylinder bores 28 and 30, the spring contact 100 is moved still further inward until the same engages the fixed terminal 92, thereby energizing the second electric conductor disposed in the housings 88 and 90.]

[It will be noted that when the pistons 36 and 37 are withdrawn, the flexible spring contacts 100 disengage their fixed contacts, unless there has been sufficient movement to force the end of the flexible contact 100 beneath the hooked fastener 96. When this occurs, however, the flexing of the spring 100 is no longer sufficient to disengage this contact, whereby the circuit controlled thereby will continue to be engaged, until such time as the plug 74 is removed and the resilient contact reset by hand.]

Figure 6:
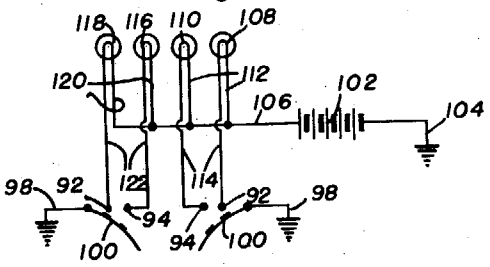
Figure 6 is a wiring diagram of a suitable electrical circuit which may be applied in either of the embodiments of Figures 2 and 7.

For an understanding of the purpose of this electrical contact arrangement, attention is directed to the wiring diagram of Figure 6, wherein it will be seen that a suitable source of electric current such as the vehicle storage battery 102, is grounded to the frame of the vehicle as at 104, and is provided with a live conduit 106. The latter is then connected to the signal lights 108 and 110 and by means of the leads 12 while leads 114 continue the circuit through these lights to the switch terminals 92 and 94, respectively, these terminals being engageable by the switch 100, from whence the current is grounded as at 98.

A second pair of lights 116 and 118 are similarly connected as by leads 120 to the live wire 106, while grounds 122 connect those lights to the terminal contacts 92 and 94, which under the control of the spring switch contact 100 are grounded as at 98.

It is contemplated that the first energized contact, namely, the contact 92, will energize warning signal lights 108 and 118 associated with the two slave cylinders 28 and 30, so that as soon as there is a shortage of fluid in the hydraulic system with which the respective pistons 36 and 37 are associated, the corresponding piston will be free to move inwardly more than its normal operating stroke, in response to operation of the foot pedal 14, so that when sufficient lost motion occurs, for any of a variety of reasons, the portion 39 of the piston will actuate the switch member 100 to energize the corresponding signal light, thus telling the driver of the vehicle at a glance that one set of the brakes of the hydraulic brake system is in dangerous condition. Upon further inward movement beyond the normal travel of the corresponding piston, the latter will not only close the warning signal [contacts] *contact* but will further activate the danger signal contact, this indicating that the piston has moved in its entire possible travel, or substantially so, and that the brakes controlled by that slave piston are substantially inoperable. This [warning] *danger* signal *in addition to the warning signal* as above mentioned will continue to be energized until such time as the plug 74 is removed for restoration of the terminal contacts to their normal position, whereby a person driving the vehicle will know that the signaling system has been manually restored to its normal position, thus indicating that the defective condition has been repaired.

It should be noted that the removable plug 74 provides a convenient and easy means for obtaining access to both of the pressure chambers of the cylinders 28 and 30, by removing a single closure plug, whereby replenishment of the fluid therein, servicing or adjustment of the switches may be readily effected. Further, by this arrangement, a single plug is provided which carries both of the switch members of each cylinder, and positions them in an operative position for convenient actuation.

Figure 7:
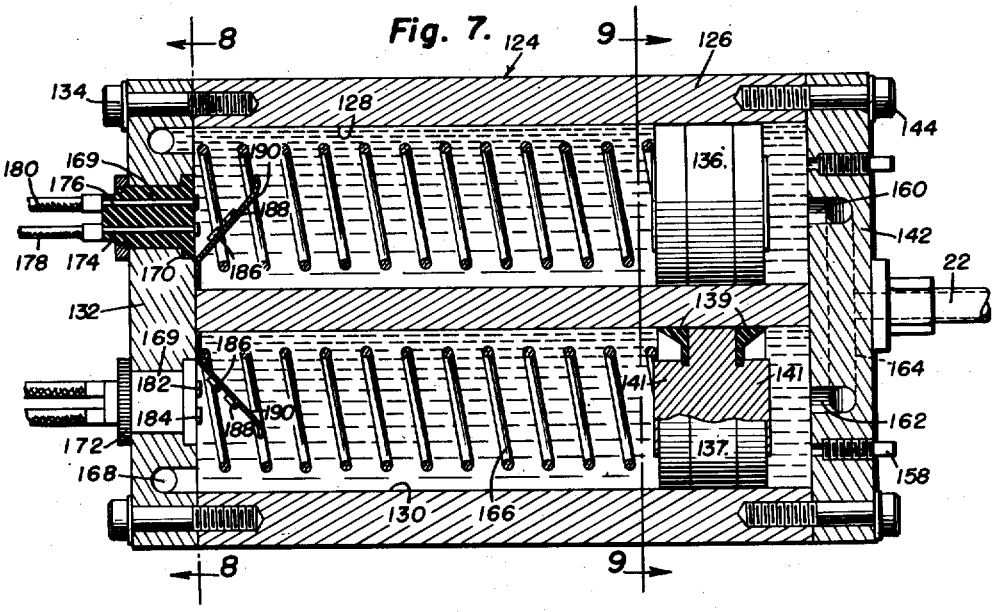
Figure 7 is a view similar to Figure 2 but showing a modified embodiment of the slave cylinder assembly.
Figure 8:
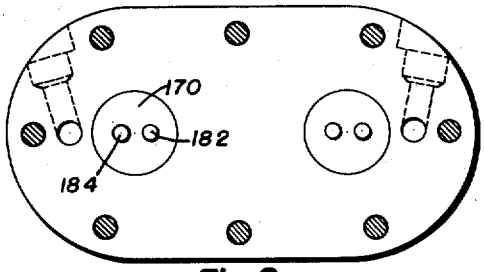
Figure 8 is a vertical transverse sectional view taken substantially on the plane of the section line 8—8 of Figure 7.
Figure 9:
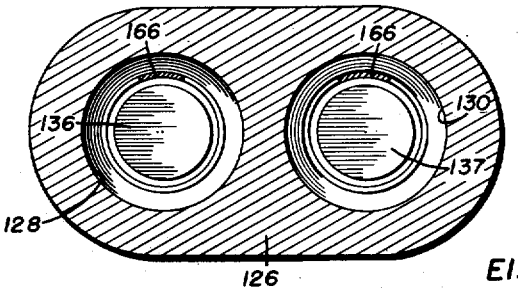
Figure 9 is a vertical transverse sectional view taken upon the plane of the section line 9—9 of Figure 7.

Attention is now directed to Figures 7–9 disclosing a modified form of the principles of the invention. In this arrangement, the slave cylinder assembly has been indicated at 124, and as in the previously described device includes a cylinder casing or block 126, which is provided with a pair of parallel cylinders 128 and 130 extending entirely through this block, the openings of the block at the opposite ends being provided with removable closure plates 132 and [42] *142*, detachably secured to the block as by fastening means 134 and 144. Pistons 136 and 137 are respectively slidable in the cylinders 128 and 130, these pistons being provided with suitable packing means 139 of conventional design, and the pistons further having central, axially extending diametrically reduced hub portions 141. The closure plate 142 is provided with the filler plugs 158, and with passages 160 and 162 communicating with the fluid chambers between the pistons 136 and 137 and the head 142, these passages being freely connected and communicating with the above-mentioned conduit 22 connected with the master brake cylinder 12, above mentioned.

Suitable compression springs 166 are positioned in the cylinders 128, 130 seated at one of their ends against the pistons 136, 137, while their other ends abut the inner surface of the closure plate 132. These springs, as do the springs 66 in the previously described embodiment, thus urge the respective piston assemblies toward their right hand or idle position, and thus serve to force the fluid back into the master cylinder through the conduit 22, by releasing the pressure upon the brake cylinder of the wheel assemblies, and permit the latter to assume their inoperative positions.

The opposite head or closure plate 132 is provided with passages 168 freely communicating with the interior of the bores 128 and 130, and which passages are, in turn, connected with the hydraulic brake lines extending to the individual wheel brake assemblies, it being understood that one cylinder 128 will be connected to one set of brakes, either the front or the rear wheels, while the other cylinder 130 will be connected to the other set of wheel brakes.

In this embodiment, the head plate 132 is provided with apertures or bores which are disposed axially of the respective cylinders 128, 130 and insulating or dielectric plugs 169 are seated in each bore, these plugs having flanged or headed portions 170 seated in corresponding counterbored shoulder recesses in the above-mentioned apertures, while the other ends of these insulated plugs are screw-threaded for the reception of insulating retaining glands 172 which are threaded upon the plugs and engage the outer surface of the head plate 132.

Electrically conductive terminals 174, 176 extend through each of these plugs, these terminals being electrically connected to the conduits [170] *178* and 180 which are connected with the signal lights as in the preceding embodiment. The ends of these terminals are headed as at 182 and 184, for engagement by the terminals 186 and 188 carried by the resilient movable terminal arm 190, these arms being grounded at one end and secured to the inner surface of the head plate 132, and being positioned to successively contact the terminals 182 and 184 as the movable contact is urged inwardly in response to abnormal inward movement of the corresponding pistons 136 and 137.

The operation of this embodiment is substantially identical with that previously described, and further explanation is believed to be unnecessary.

Since numerous modifications will readily occur to those skilled in the art, after a consideration of the foregoing specification and accompanying drawings, it is not desired to limit the invention to the exact construction shown and described, but all suitable modifications and equivalents may be resorted to as falling within the scope of the appended claims.

Having described the invention, what is claimed as new is:

1. In a hydraulic brake system, a master cylinder and a slave cylinder assembly operatively connected thereto, individual wheel cylinders having hydraulic lines connected to said slave cylinder assembly, said slave cylinder assembly comprising a plurality of slave cylinders with pistons slidable therein, an operative connection between said master cylinder and one end of said slave pistons, pressure chambers at the other end of each of said pistons, each of said pressure chambers being connected to one of said hydraulic lines, an intermittently operated electric switch in each of said pressure chambers for signaling a predetermined travel of the piston therein, a second switch in each chamber for indicating piston travel in excess of said predetermined travel, fastening means for holding said second switch closed upon actuation thereof and a stop for limiting piston travel towards said switches, a signaling device and electric circuits connecting said switches thereto.

2. The combination of claim 1, including a plug mounted in each slave cylinder, and carrying each of said switches and said stop.

3. The combination of claim 1, including a plug mounted in each slave cylinder, and carrying each of said switches and said stop, and said fastening means.

4. The combination of claim 1, wherein said slave cylinders are parallel and have a common closure plate for their pressure chambers, a plug extending through said plate and into each chamber, said switches being mounted in said plug and extending into said chambers for actuating engagement by the respective pistons.

5. The combination of claim 4, wherein said pair of switches have a common actuating member positioned in the path of movement of the piston for actuation thereby.

6. The combination of claim 5, wherein said fastener is mounted on said plug and is adapted to engage and retain said actuating member when the latter is moved into engagement with said second switch.

7. The combination of claim 6, wherein said stop is carried by said plug.

8. The combination of claim 7, wherein said actuating member is mounted on said stop.

*9. In a hydraulic brake system, a master cylinder and a slave cylinder assembly operatively connected thereto, individual wheel cylinders having hydraulic lines connected to said slave cylinder assembly, said slave cylinder assembly comprising a plurality of slave cylinders with pistons slidable therein, an operative connection between said master cylinder and one end of said slave pistons, pressure chambers at the other end of each of said pistons, each of said pressure chambers being connected to one of said hydraulic lines, an intermittently operated electric switch in each of said pressure chambers for signaling a predetermined travel of the piston therein, a second switch in each chamber for indicating piston travel in excess of said predetermined travel, a signal device and a normally open electric circuit connected to each of the switches for closure by the latter, means for maintaining one of the circuits closed upon actuation of the second switch and during subsequent movements of the piston, and a stop for limiting piston travel towards the switches.*

*10. The combination of claim 9, wherein said circuits are arranged in parallel and are connected to a common source of electrical energy.*

*11. In a hydraulic brake system, a master cylinder and a slave cylinder assembly operatively connnected thereto, individual wheel cylinders having hydraulic lines connected to said slave cylinder assembly, said slave cylinder assembly comprising a plurality of slave cylinders with pistons slidable therein, an operative connection between said master cylinder and one end of said slave pistons, pressure chambers at the other end of each of said pistons, each of said pressure chambers being connected to one of said hydraulic lines, a pair of normally open electric switches associated with each of said slave cylinders, means for closing one of said switches when the piston is disposed inwardly of a predetermined position in the chamber and also for closing the other switch when the piston is disposed inwardly of a second predetermined position in the chamber, a signal device and an electric circuit connected to each of said switches for closure thereby, and means for maintaining one of the circuits closed during subsequent movements of the piston.*

*12. In a hydraulic brake system, a master cylinder and a slave cylinder assembly operatively connected thereto, individual wheel cylinders having hydraulic lines connected to said slave cylinder assembly, said slave cylinder assembly comprising a plurality of slave cylinders with pistons slidable therein, an operative connection between said master cylinder and one end of said slave pistons, pressure chambers at the other end of each of said pistons, each of said pressure chambers being connected to one of said hydraulic lines, a pair of normally open electric switches associated with each of said slave cylinders, means for closing one of said switches when the piston is disposed inwardly of a predetermined position in the chamber and also for closing the other switch when the piston is disposed inwardly of a second predetermined position in the chamber, a signal device and an electric circuit connected to each of said switches for closure thereby, and means for maintaining one of said switches closed upon travel of the piston beyond said second predetermined position during subsequent movements of the piston.*

*13. In a hydraulic brake system, a master cylinder and a slave cylinder assembly operatively connected thereto, individual wheel cylinders having hydraulic lines connected to said slave cylinder assembly, said slave cylinder comprising a plurality of slave cylinders with pistons slidable therein, an operative connection between said master cylinder and one end of the slave pistons, pressure chambers at the other end of each of said pistons, each of said pressure chambers being connected to one of said hydraulic lines, a normally open electric switch in each of said pressure chambers, means for closing said switch when the piston is disposed inwardly of a predetermined position in the chamber, means responsive to the piston having been disposed a predetermined distance inwardly of the predetermined position to keep the switch closed during subsequent movements of the piston, and a signaling device and an electric circuit connected to the switch for operation thereby.*

*14. In a hydraulic brake system, a master cylinder and a slave cylinder assembly operatively connected thereto, individual wheel cylinders having hydraulic lines connected to said slave cylinder assembly, said slave cylinder assembly comprising a plurality of slave cylinders with pistons slidable therein, an operative connection between said master cylinder and one end of said slave pistons, pressure chambers at the other end of each of said pistons, each of said pressure chambers being connected to one of said hydraulic lines, a normally open electrical circuit including a signal device associated with each of said slave cylinders and the piston slidable therein, means for closing said circuit during the interval the piston is disposed inwardly of a predetermined position in the chamber, means for maintaining the circuit closed continuously subsequent to the piston having traveled a predetermined distance inwardly of said predetermined position.*

*15. The combination of claim 14, wherein said last and said penultimate means each include a switch, said signaling device including a pair of signal elements, said electrical circuit having branches thereof arranged in parallel, one of the signal elements and one of the switches being in*

*series relation in each of the parallel branches of the electrical circuit, whereby closure of either of said switches closes the circuit with respect to one of the signal elements.*

*16. The combination of claim 14, wherein said last and said penultimate means each include a switch, said signaling device including a pair of signal elements, said electrical circuit having branches thereof arranged in parallel, one of the signal elements and one of the switches being in series relation in each of the parallel branches of the electrical circuit, whereby closure of either of said switches closes the circuit with respect to one of the signal elements, said last means further including a fastening means for holding one of said switches closed.*

*17. The combination of claim 14, wherein said last and said penultimate means each include a switch, said signaling device including a pair of signal elements, said electrical circuit having branches thereof arranged in parallel, one of the signal elements and one of the switches being in series relation in each of the parallel branches of the electrical circuit, whereby closure of either of said switches closes the circuit with respect to one of the signal elements, said last means including a fastening means for holding both of said switches closed.*

*18. In a hydraulic brake system, a master cylinder and a slave cylinder and a slave cylinder assembly operatively connected thereto, individual wheel cylinders having hydraulic lines connected to said slave cylinder assembly, said slave cylinder assembly comprising a plurality of slave cylinders with pistons slidable therein, an operative connection between said master cylinder and one end of said slave pistons, pressure chambers at the other end of each of said pistons, each of said pressure chambers being connected to one of said hydraulic lines, an intermittently operated electric switch in each of said pressure chambers for signaling a predetermined travel of the piston therein, a second switch in each chamber for indicating piston travel in excess of said predetermined travel, a signal device and a normally open electric circuit connected to each of the switches for closure by the latter, and means for maintaining one of the circuits closed upon actuation of the second switch independently of subsequent piston positions.*

ELSWORTH E. MAPES.
RUSSELL E. COX.

REFERENCES CITED

The following references are of record in the file of this patent or the original patent:

UNITED STATES PATENTS

| Number | Name | Date |
|---|---|---|
| 1,557,330 | Reynolds | Oct. 13, 1925 |
| 2,121,653 | Davis | Jan. 21, 1938 |